Nov. 30, 1971   M. A. EGGENBERGER   3,623,324
ELECTROHYDRAULIC SPEED CONTROL SYSTEM FOR
CROSS COMPOUND TURBINE POWER PLANTS
Filed July 15, 1969                2 Sheets-Sheet 1

CROSS-OVER STEAM ADMISSION VALVE ACTUATOR(38)

INVENTOR:
MARKUS A. EGGENBERGER,
BY W. C. Crutcher
HIS ATTORNEY.

United States Patent Office 3,623,324
Patented Nov. 30, 1971

3,623,324
ELECTROHYDRAULIC SPEED CONTROL SYSTEM FOR CROSS COMPOUND TURBINE POWER PLANTS
Markus A. Eggenberger, Schenectady, N.Y., assignor to General Electric Company
Filed July 15, 1969, Ser. No. 841,709
Int. Cl. F01d 13/00
U.S. Cl. 60—102
7 Claims

ABSTRACT OF THE DISCLOSURE

An electrohydraulic speed control system for automatically matching the speed of the low pressure and high pressure shafts of a cross compound steam turbine-generator. The low pressure unit is controlled in response to a speed signal from the high pressure unit which is used as the speed reference for the low pressure shaft speed control. An acceleration catch-up bias signal is supplied to the low pressure acceleration control for accelerating the low pressure shaft to reduce an initially existing speed difference to about zero. A preemergency control channel insures that the turbine will be safely controlled when approaching an overspeed condition.

BACKGROUND OF THE INVENTION

This invention relates to a method and apparatus for automatically controlling a cross compound turbine-generator of the type having shaft-driven exciters, especially during the startup, synchronizing and loading phase of operation. More specifically, the invention relates to controlling crossover steam admission from a high pressure steam source to the low pressure turbine shaft so as to supplement the normal supply of steam from the high pressure turbine shaft.

Electrical control systems for controlling shaft speeds and accelerations by comparing actual speeds or actual accelerations with reference signals in a closed loop are known in the art. Solid state operational amplifiers have been used to provide the various desired functions in the form of electrical signals and the resulting amplified electrical signals have been used to operate servo valves which, in turn, actuate hydraulic valve-positioning rams to control the admission of steam to the turbines.

Highly reliable electrohydraulic systems have been developed which include the use of multiple control signals applied to a gating device which permits only one signal to control at a time. A patent which helps to provide background for the present invention is U.S. Patent 3,340,883 issued Sept. 12, 1967 to Jacob R. Peternel, which patent is assigned to the assignee of the present application and which is incorporated herein by reference. The control system of that patent used an acceleration error signal and a speed error signal supplied to a gating device which passed only the signal which called for the lowest turbine valve opening.

When a cross compound steam turbine-generator unit is started without tying the shafts together electrically on turning gear, the high pressure shaft will start and accelerate faster than the low pressure shaft, because most of the driving energy is released in the first stage and almost none is left for the low pressure shaft.

If a plant is equipped with shaft driven exciters only, there is no way of applying a field current to the generators unless they are running at a speed substantially higher than turning gear speed; approximately half of rated speed is most frequently used. In order to pull the two generators into synchronism, the speed difference (electrically) should be small; less than 5% of rated speed is a frequently stated limit. Therefore, some means must be provided for boosting the acceleration of the low pressure shaft and controllably matching shaft speeds within a reasonably short time so that the generators can be synchronized. Suitable overspeed controls of a pre-emergency type should also be provided to bring possible overspeed of the low pressure shaft under control before the conventional emergency overspeed trip functions.

OBJECTS OF THE INVENTION

Accordingly, one object of the present invention is to provide a control system which will enable rapid electrical synchronization of the low pressure and high pressure units of a cross compound turbine-generator with shaft driven exciters at a speed substantially higher than turning gear speed.

A further object of the invention is to provide a control system for a cross compound turbine which automatically slaves a low pressure unit to the high pressure unit at any selected speed substantially lower than rated speed.

Still another object of the invention is to provide a control system for a cross compound turbine which accelerates the low pressure unit faster than the high pressure unit so that the units may be synchronized at some speed lower than rated speed.

The subject matter of the invention is particularly pointed out and distinctly claimed in the concluding portion of the specification. The invention, however, both as to organization and method of practice, together with further objects and advantages thereof, may best be understood by reference to the following description taken in connection with the accompanying drawings in which:

SUMMARY OF THE INVENTION

Briefly stated, the invention is practised by providing a speed and acceleration control unit with two speed and acceleration control channels. The first channel receives an electrical speed signal from the high pressure shaft and functions through the conventional load control system to admit steam in series flow through the turbines on the high pressure and low pressure shafts. The second channel receives a speed signal from the low pressure shaft and operates a crossover steam admission valve which bypasses high pressure steam to the low pressure shaft. The high pressure shaft speed signal also serves as the speed reference for the crossover admission valve control or second channel, thereby slaving the speed of the low pressure shaft to that of the high pressure shaft.

In another aspect of the invention, a pre-emergency control channel is provided which operates in conjunction with the normal speed and acceleration control, by comparing the low pressure shaft actual speed signal with a pre-emergency reference speed signal. An additional feature which may be included in the present invention is a low pressure shaft catch-up bias signal for increasing the acceleration set point of the second control channel in order to reduce the time necessary for obtaining proper electrical synchronization of the two shafts.

Figure 1:
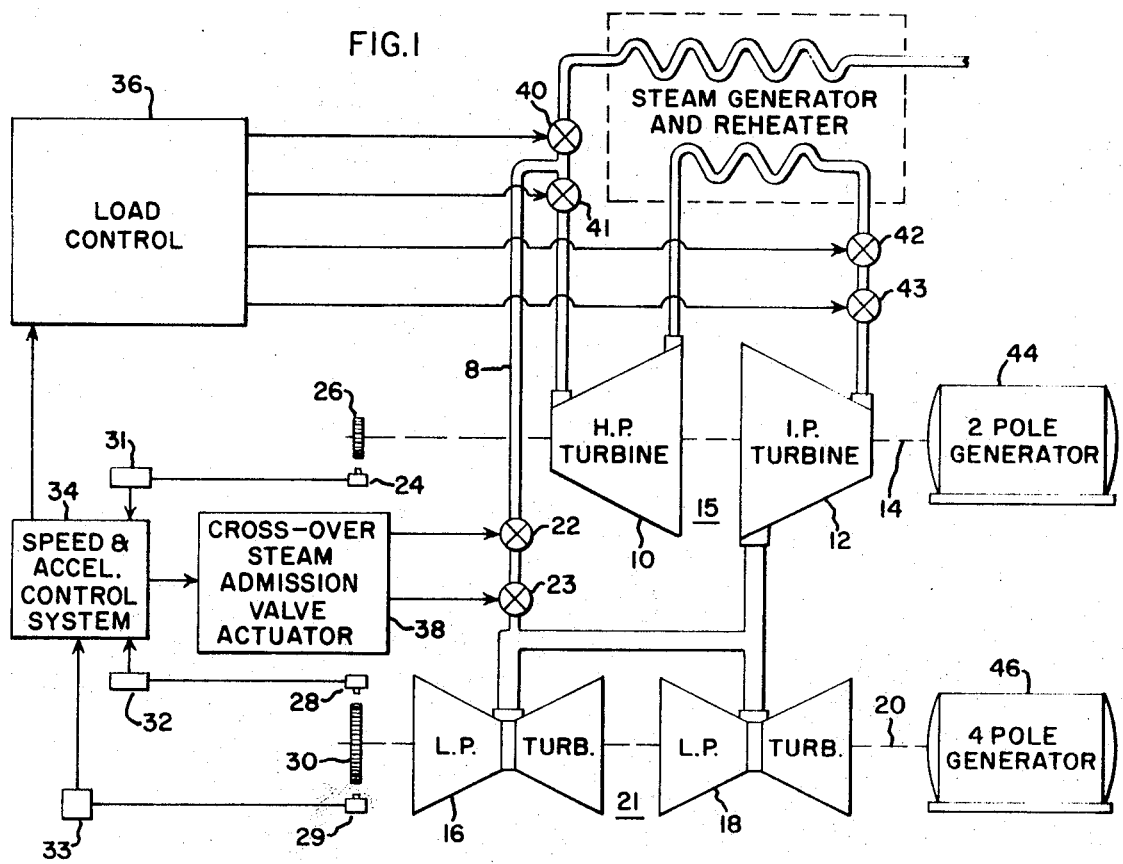
FIG. 1 is an overall schematic block diagram showing a cross compound steam turbine power plant provided with a control scheme including an electrohydraulic speed and acceleration control system which comprises the subject matter of the present invention.

General layout of overall power plant (FIG. 1)

Referring now to the drawing in which like numerals are used to indicate like parts throughout the various views thereof, FIG. 1 shows a high pressure steam turbine 10 and an intermediate pressure reheat steam turbine 12 mounted in tandem on a single high pressure shaft 14 to form an overall high pressure unit 15. Low pressure steam turbines 16 and 18 are mounted in tandem on a low pressure shaft 20 to form an overall low pressure unit 21.

Steam flows in series from the steam generator through high pressure unit 15 and low pressure unit 21 to a condenser (not shown). A supplementary source of high pressure steam bypasses the high pressure unit via pipe 8 and is controlled by crossover steam admission stop valves 22 and control valves 23.

A high pressure shaft speed sensor 24 of the variable reluctance type is positioned with respect to a toothed wheel 26 which is rotatably mounted on the high pressure shaft 14. A pair of similar variable magnetic reluctance sensors 28, 29 are positioned about and are responsive to the rotation of a second toothed wheel 30 rotatably mounted on the low pressure shaft 20. For the purposes of the preferred embodiment, the high pressure toothed wheel 26 is provided with half the number of teeth as compared to the low pressure toothed wheel 30 so that identical signals will be obtained when the low pressure shaft is rotating at half the speed of the high pressure shaft.

The signals from sensors 24, 28 and 29 are amplified and converted to DC voltages within frequency-to-voltage converters and amplifier devices 31, 32 and 33. The signal voltages supplied from these devices are proportional to frequency and therefore proportional to actual turbine shaft speed. The voltages are filtered within the devices 31-33 and are directed from there to a turbine speed and acceleration control system 34, which is the subject matter of the present invention and which will be explained in detail later in FIG. 2 of the drawing.

In response to the actual speed signals from the low pressure and high pressure shafts, the control system 34 supplies control signals to both a load control 36 and an electrohydraulic crossover steam admission valve actuator 38. The load control 36 controls the speed and loading of both the high pressure unit 15 and the low pressure unit 21 by controlling the admission of steam through stop valves 40, control valves 41, reheat stop valve 42 and intercept valve 43 as long as the two generators are tied together electrically. The electrohydraulic crossover valve actuator 38 controls steam bypassed to the low pressure unit via pipe 8 by controlling valves 22 and 23.

Figure 2:
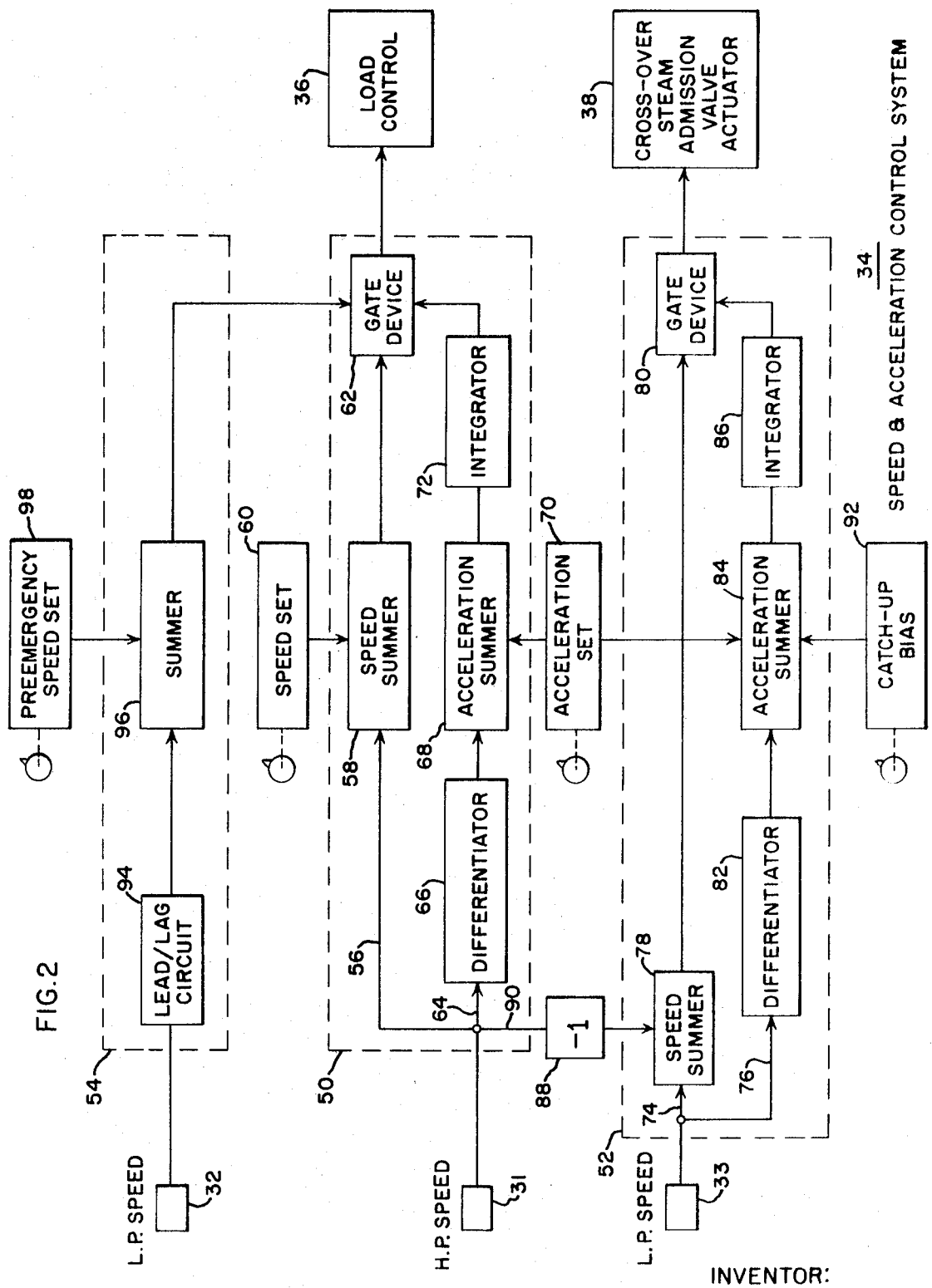
FIG. 2 is a simplified diagram of the electrohydraulic speed and acceleration control system of the present invention indicated in block form in FIG. 1.

General description of speed and acceleration control system (FIG. 2)

The turbine speed and acceleration control system indicated by block 34 in FIG. 1 is shown in greater detail in FIG. 2. This includes a first or normal speed and acceleration control channel shown within dotted lines 50, a second or crossover steam admission control channel 52, and a pre-emergency control channel 54.

The first channel 50 receives an electrical signal indicating actual high pressure shaft speed from device 31 and furnishes an output signal to the load control 36 which controls the admission of steam to the high pressure and low pressure units through controlling the stop valves, control valves and intercept valves 40–43. The second channel 52 receives an actual speed signal from the low pressure shaft speed transducer 33 and supplies an output signal to the crossover steam admission valve actuator 38.

The pre-emergency control channel 54 receives a speed signal from the low pressure shaft and modifies the output of the normal speed and acceleration control channel 50 under pre-emergency conditions.

Normal speed and acceleration channel 50

Channel 50 operates according to a known system disclosed in the aforesaid Peternel Patent 3,340,883. The high pressure actual speed signal enters the speed control branch 56 and is compared in speed summer 58 with a reference speed signal set from an external station 60. The output from summer 58 (or speed error signal) is applied to a gating device 62. Gate 62 is arranged to receive a number of input signals, but to provide only that output signal which places the steam valves in the lowest position. Gate 62 may comprise, for example, a number of interconnected diode devices receiving analog signals, or it may consist of a digital comparison device.

The high pressure actual speed signal also passes via an acceleration branch 64 to a differentiator 66 which produces an actual acceleration signal. This in turn is applied to an acceleration summer 68 where it is compared to a reference or desired acceleration signal applied from an external station 70. The difference (or acceleration error signal) is integrated with respect to time and the integrated acceleration error signal is applied to gate 62. The turbine will accelerate at a rate set at 70 toward a final speed set on device 60. When the set speed is approached, control will shift from the acceleration branch 64 to the speed control branch 56. The aforementioned control is known in the art, but an understanding is necessary toward understanding the present invention.

Crossover steam admission control channel 52

The second control channel 52 employs similar components and is arranged like the aforementioned channel 50. The low pressure actual speed signal is applied to a speed control branch 74 and an acceleration control branch 76. These include, as before, a speed summer 78 in the speed branch connected to a gating device 80. In the acceleration branch, a differentiator 82, an acceleration summer 84, and an integrator 86, also have an output connected to gate 80. Gate 80 is connected as before so that the single controlling signal will be the one which places the crossover steam admission valve actuator 38 in the lowest valve position.

It will be observed that the reference or set speed applied to speed summer 78 is obtained from a polarity reversing device 88, having as its input the actual high pressure shaft speed signal from a third branch 90. By this means, the high pressure shaft speed is adapted so that it becomes the reference or set speed for the low pressure speed summer 78. Thus when the low pressure unit is in the speed control mode, it is slaved to the high pressure unit.

It will further be observed that the external acceleration reference setting device 70 provides a common reference input to acceleration summer 84 as well as to acceleration summer 68 mentioned previously. Thus the same desired acceleration or reference signal is supplied to both the normal channel 50 and the crossover admission channel 52.

In order to increase the acceleration of the low pressure shaft, means for applying an added catch-up bias signal to the acceleration summer 84 is supplied by an external station 92. This causes a higher effective acceleration setting to be applied to the crossover valve actuator control channel.

Pre-emergency speed control channel 54

The pre-emergency channel 54 receives an actual low pressure shaft speed signal and applies it to a lead/lag circuit 94 which serves to stabilize the signal and the output is applied to a summer 96 where it is compared to a pre-emergency speed setting applied from an external station 98. The output or error signal is applied to the gate 62 in the normal control channel. The pre-emergency speed setting at 98 is set at a desired increment above rated speed, such as 105% of rated speed. The pre-emergency channel, therefore, is a redundant safety feature controlled by speed of the low pressure shaft and having an overriding effect tending to close all of the valves through the normal load control unit 36 when the low pressure shaft overspeeds.

Figure 3:
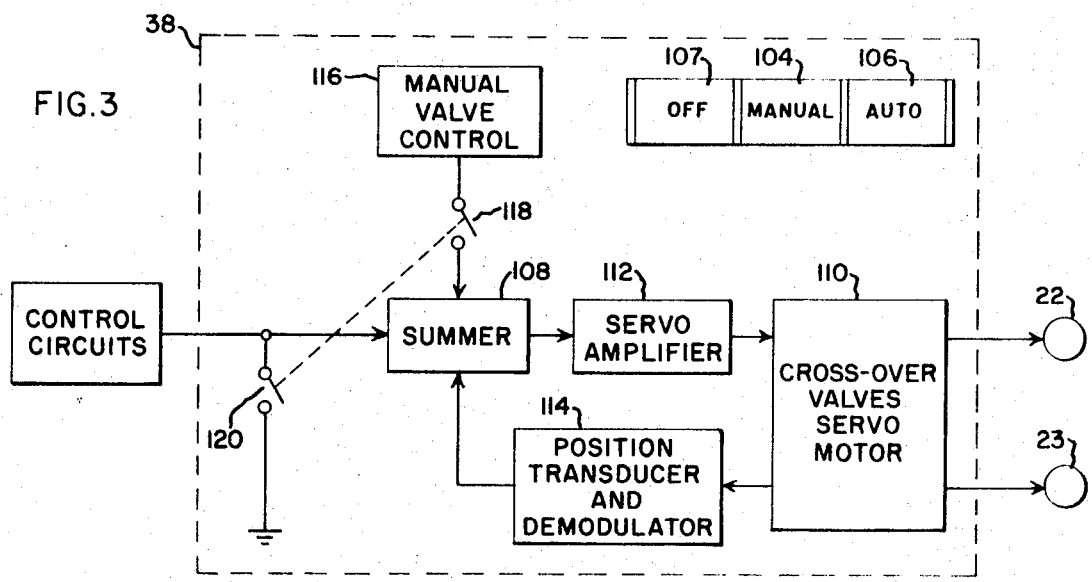
FIG. 3 is a simplified diagram of an electrohydraulic valve control system for controlling admission of crossover steam to the low pressure unit of the power plant shown in FIG. 1.

Crossover steam admission valve actuator (FIG. 3)

Referring now to FIG. 3 in more detail, the output of the gate device 80 controls the crossover admission valves 22 and 23 through the crossover steam admission valve actuator indicated generally as 38. The load control signal from gate 80 is supplied to a summer 108 which sends an error signal to a crossover admission control valve servo motor 110 after signal amplification in a servo amplifier 112. The servo motor 110 then properly operates the crossover steam admission valves 22 and 23. A feedback loop is provided by supplying actual valve position signal from a position transducer and demodulator 114 to the summer 108 for comparison therein with the incoming desired valve position signal from the gate 80. A manual crossover steam admission valve control 116 is provided and is connected with the summer 108 through a switch 118. An additional switch 120 connected to ground is provided in the input circuit of summer 108. Switch 120 is closed when switch 118 is closed for manual control so that the speed signals from the low pressure low value gate device 62 are not received by the electro-hydraulic servo control loop.

The crossover steam admission stop valve 22 is air operated and is controlled in an on/off mode by solenoid air valves. The solenoid air valves are energized whenever either the manual button 104 or the automatic button 106 is depressed. They are deenergized whenever the crossover steam admission valve control system 38 is in the off condition by pushing an off button 107. The same voltage energizing the crossover admission stop valve 22 solenoids will energize solenoid fluid valves to admit hydraulic fluid to the crossover admission control valve 23. When these solenoid fluid valves are deenergized, there will be only a small leakage flow to keep the manifold filled with fluid. The off button 107 of the overall crossover steam control system also grounds the speed signal through the switch 120 from the low pressure low value gate device 62 and simultaneously deenergizes the entire servo loop.

BRIEF SUMMARY

It can be seen that a speed and acceleration control system for a cross compound steam turbine has been provided which allows easy synchronization of high pressure and low pressure shafts at a speed below rated speed. In the speed control system, a normal control channel functions to provide normal speed and acceleration control to the main steam valves. The crossover steam admission channel supplements steam flow to the low pressure shaft. The speed reference for this crossover channel is the speed of the high pressure shaft. Both channels include acceleration branches set from a common station. A catch-up bias feature is added to the crossover channel to increase the acceleration set point for the low pressure shaft.

Pre-emergency control is provided by an additional channel which receives a low pressure shaft speed, compares a function of that speed with a pre-emergency speed setting and reduces the control valve opening signal through the normal speed control channel if conditions dictate.

While the invention has been described in connection with a simple cross compound steam turbine, it will be apparent that the same principles can be used in controlling the shaft speeds of other compound power plants. Hence, other modifications of the invention will occur to those skilled in the art, and while there has been described herein what is considered to be the preferred embodiment of the invention, it is of course intended to cover all such modifications as fall within the true spirit and scope of the invention.

What I claim as new and desire to secure by Letters Patent of the United States is:

1. In a steam turbine control system having at least a first and a second turbine on separate shafts and connected to a source of motive fluid for series flow therethrough, the combination of:
   first valve means for controlling the flow of motive fluid through the first and second turbines,
   second valve means for controllably bypassing motive fluid to the second turbine,
   a first speed and acceleration control channel responsive to first turbine speed and providing an output signal for positioning the first valve means,
   a second speed and acceleration control channel responsive to second turbine speed and providing an output signal for positioning the second valve means, and
   means connected to receive the first turbine actual speed signal and to adapt it to act as a speed setting for said second channel, whereby under steady state conditions, the speed of the second turbine is slaved to the speed of the first turbine.

2. The combination according to claim 1, wherein said first and second channels include means applying a common desired acceleration setting to both of said channels, and further means for supplying a catch-up bias adapted to augment the acceleration setting of said second channel.

3. The combination according to claim 1, and further including a pre-emergency channel comprising means for comparing a function of second turbine speed with a pre-emergency speed setting, the difference signal being operatively connected to said first channel and arranged to assume control of said first valve means when the second turbine overspeeds.

4. In a control system for a cross compound steam turbine-generator having high pressure and low pressure turbine shafts, the combination of:
   first valve means for controlling flow of steam to the high pressure and low pressure shafts in series flow relationship,
   second valve means for controllably bypassing steam to the low pressure shaft,
   first electrohydraulic servo means for positioning the first valve means in response to an electrical signal,
   second electrohydraulic servo means for positioning said second valve means in response to an electrical signal,
   a first speed and acceleration control channel responsive to high pressure shaft speed and having its output connected to said first servo means,
   a second speed and acceleration control channel responsive to low and high pressure shaft speed and having its output connected to said second servo means,
   said first and second channels each including a speed branch and an acceleration branch supplying signals to a gating device which passes only the one signal which would result in the lowest position of said valve means, and
   means for adapting the high pressure shaft actual speed signal to act as the speed setting to said speed branch of said second channel, whereby the low pressure shaft is slaved to the high pressure shaft when the second channel is controlling speed.

5. The combination according to claim 4, including a supplementary acceleration catch-up bias signal applied to said acceleration branch of said second channel, whereby the low pressure shaft acceleration is increased when the second channel is controlling acceleration.

6. The combination according to claim 4, wherein there is provided a pre-emergency control channel having means comparing a function of the low pressure actual shaft speed to a selectable reference signal, the difference signal being further supplied to the gating device of said first channel, whereby a pre-emergency condition of low pressure shaft speed controls said first valve means.

7. A method for starting and synchronizing a cross compound turbine power plant having a high pressure shaft, a low pressure shaft, and an electrohydraulic control system including low pressure shaft and high pressure shaft speed and acceleration control channels comprising the steps of:
supplying a high pressure shaft actual speed electrical signal to the low pressure shaft control channel whereby the magnitude of the speed reference for the low pressure shaft is proportional to the speed of the high pressure shaft,
supplying a common desired acceleration setting to both of said channels, and
supplying an acceleration catch-up bias signal to the low pressure shaft control channel whereby the low pressure shaft may be accelerated faster than the high pressure shaft in order to synchronize said shafts.

References Cited

UNITED STATES PATENTS

| | | | |
|---|---|---|---|
| 2,955,429 | 10/1960 | Miller | 60—102 X |
| 3,340,883 | 9/1967 | Peternel | 415—17 X |

FOREIGN PATENTS

| | | | |
|---|---|---|---|
| 733,350 | 5/1966 | Canada | 60—105 |

OTHER REFERENCES

Westinghouse Instruction Manual, pp. GNO 28.00–28.04, Oct. 8, 1965.

MARTIN P. SCHWADRON, Primary Examiner

A. M. OSTRAGER, Assistant Examiner